United States Patent [19]

Flotow et al.

[11] 4,181,199

[45] Jan. 1, 1980

[54] CALIPER TYPE DISC BRAKE

[75] Inventors: Richard A. Flotow, Fort Wayne; Hans Stiel, Auburn, both of Ind.

[73] Assignee: Dana Corporation, Toledo, Ohio

[21] Appl. No.: 904,817

[22] Filed: May 11, 1978

[51] Int. Cl.² .......................................... F16D 55/224
[52] U.S. Cl. ................................................ 188/72.9
[58] Field of Search ................ 188/18 A, 24, 59, 72.6, 188/72.9, 106 F

[56] References Cited

U.S. PATENT DOCUMENTS

| | | | |
|---|---|---|---|
| 2,953,221 | 9/1960 | Lucien | 188/72.9 |
| 3,608,678 | 9/1971 | Kobayashi | 188/72.6 |
| 3,703,944 | 11/1972 | Hendrickson | 188/72.2 |
| 3,853,206 | 12/1974 | Kibler et al. | 188/72.9 |
| 3,907,074 | 9/1975 | Rist | 188/72.9 |

FOREIGN PATENT DOCUMENTS

| | | | |
|---|---|---|---|
| 883624 | 10/1971 | Canada | 188/72.9 |
| 1148664 | 12/1957 | France | 188/72.9 |
| 1553950 | 12/1968 | France | 188/72.9 |

*Primary Examiner*—Duane E. Reger
*Attorney, Agent, or Firm*—Wilson, Fraser, Barker & Clemens

[57] ABSTRACT

A mechanical caliper type disc brake is disclosed for vehicles such as trucks and trailers where high torque ratings are required. The brake structure of the invention is employed for applying frictional braking forces to opposite braking surfaces of a rotatable rotor. The brake structure includes a pair of friction pads disposed on opposite sides of the rotor, caliper means providing support for at least one of the friction pads, lever means having spaced apart action and reaction lobe portions, and pivot means for pivotally supporting the lever means at a location between the action and reaction lobe portions whereby when the lever means is moved about the pivot means, the action lobe portion thereof urges one of the friction pads to move in one direction to frictionally engage one side of the rotor and simultaneously the reaction lobe portion thereof urges the caliper and the other of the friction pads to move in an opposite direction causing the friction pad to frictionally engage the other side of the rotor.

5 Claims, 7 Drawing Figures

CALIPER TYPE DISC BRAKE

BACKGROUND OF THE INVENTION

Due to the mass of vehicles such as trucks and trailers, it is essential that the attendant braking systems for such vehicles are of high torque ratings. Most of the braking systems utilizing the caliper type disc brakes are either single or dual piston actuated hydraulic or pneumatic powered systems. Such systems require periodic adjustment, cleaning, inspection and lubrication.

It is an object of the present invention to produce a mechanical caliper type disc brake for vehicles such as trucks and trailers where higher torque ratings are required.

Another object of the invention is to produce a mechanical caliper type disc self adjusting brake which will inherently and automatically compensate for wear and uneven wear of the associated brake linings.

Still another object of the present invention is to produce a mechanical caliper type disc brake wherein the major components may be formed of a die cast high tensile strength material to ensure a combination of high strength and light weight.

Another object of the invention is to produce a mechanical caliper type disc brake which does not require routine adjustment, cleaning, inspection and lubrication.

Another object of the invention is to produce a mechanical caliper type disc brake suitable for heavy duty applications and is capable of rapid dissipation of heat energy to thereby maintain low temperature on the brake lining and braking surface to improve the fade characteristics thereof.

SUMMARY OF THE INVENTION

The above objects of the invention are typically achieved in a mechanical caliper type disc brake system having a rotatable rotor which includes a pair of friction pads disposed on opposite sides of the rotor; caliper means providing support for at least one of the friction pads; lever means having spaced apart action and reaction lobe portion; and pivot means for pivotally supporting the lever means at a location between the action and the reaction lobe portions whereby when the lever means is moved about the pivot means the action lobe portion thereof urges one of the friction pads to move in one direction to frictionally engage one side of the rotor and simultaneously the reaction lobe portion thereof urges the caliper and the other of the friction pads to move in an opposite direction causing the friction pad to frictionally engage the other side of the rotor.

BRIEF DESCRIPTION OF THE DRAWINGS

The above, as well as other objects and advantages of the invention will be readily understood by one skilled in the art reading the following detailed description of a preferred embodiment of the invention when considered in the light of the accompanying drawings, in which.

DETAILED DESCRIPTION OF THE PREFERRED EMBODIMENT

Figure 3:
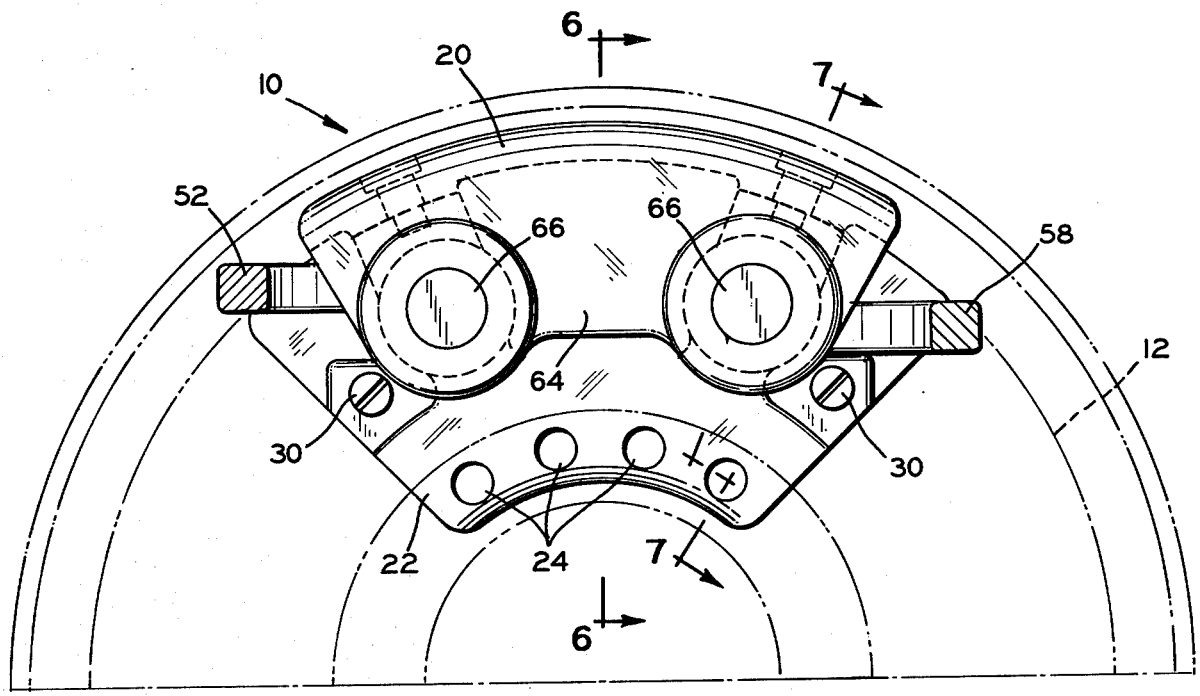
FIG. 3 is a side view of the apparatus illustrated in FIG. 2 viewed from the left side thereof.
Figure 4:
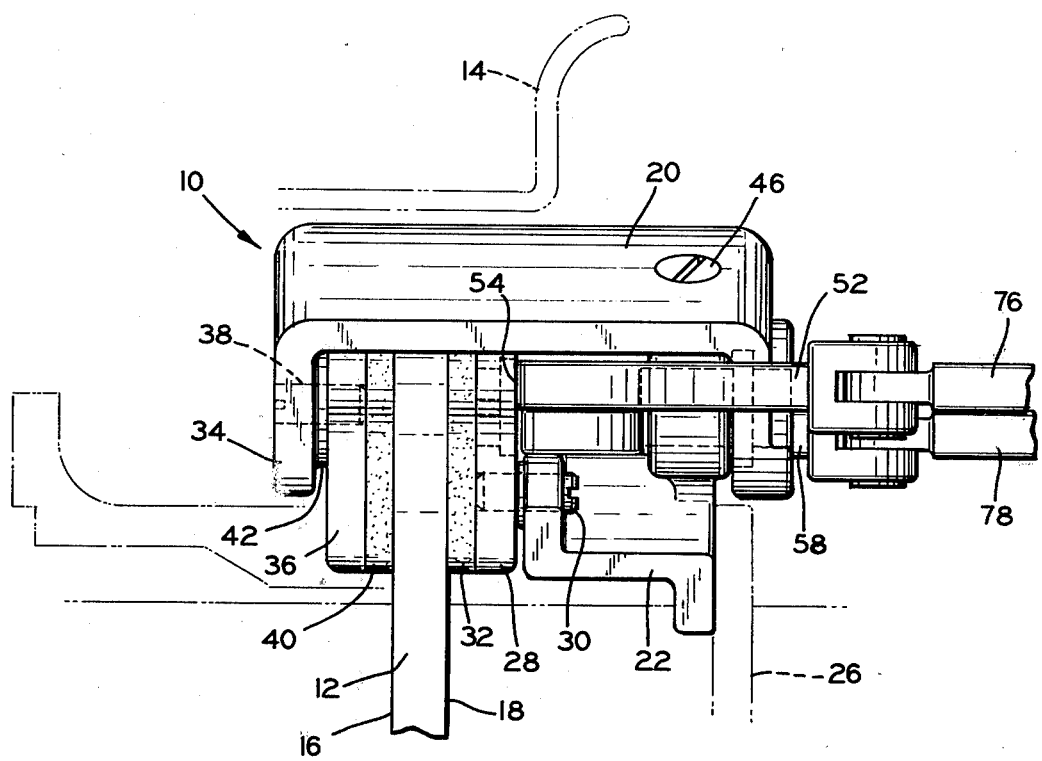
FIG. 4 is a front view of the apparatus illustrated in FIG. 2.
Figure 5:
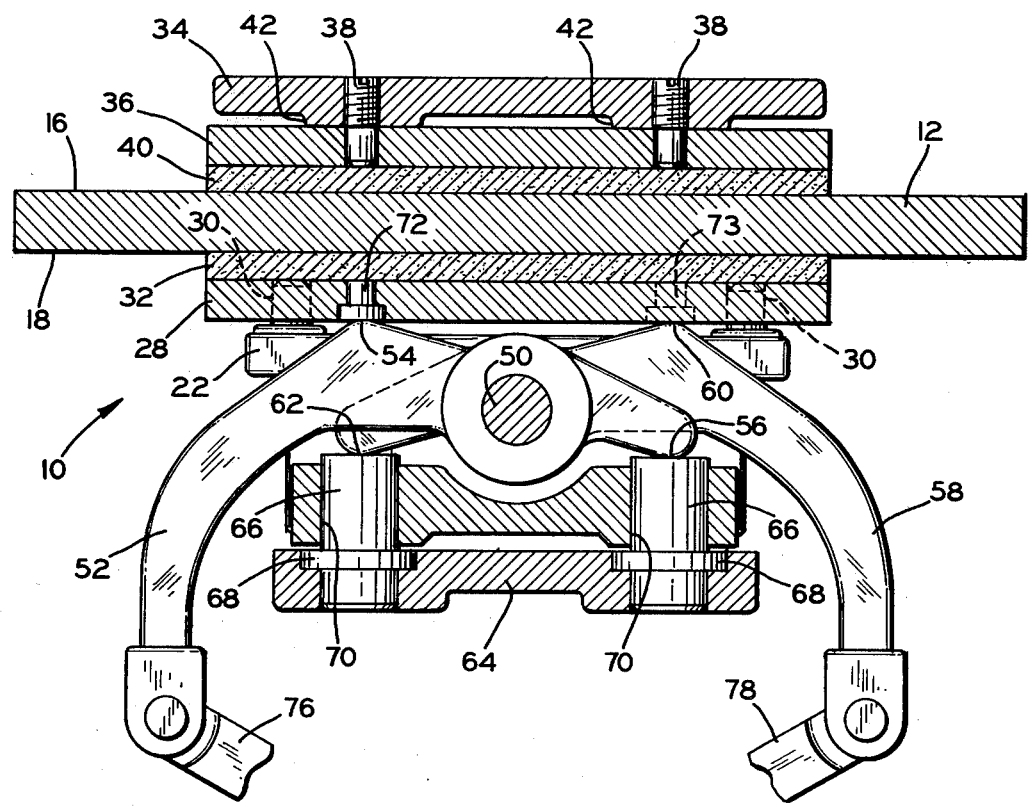
FIG. 5 is a top view of the assembled form of the braking system illustrated in FIG. 1 similar to the illustration in FIG. 2 partly in section to more clearly illustrate the components thereof.
Figure 6:
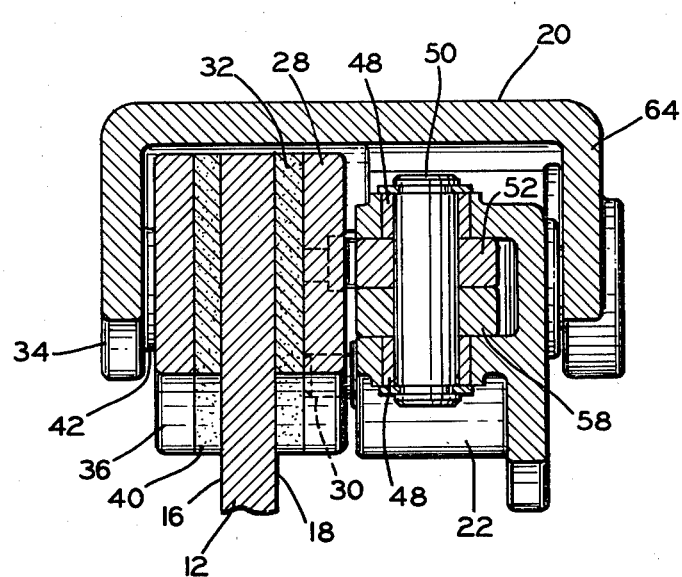
FIG. 6 is a sectional view of the apparatus illustrated in FIG. 3 taken along line 6—6 thereof.
Figure 7:
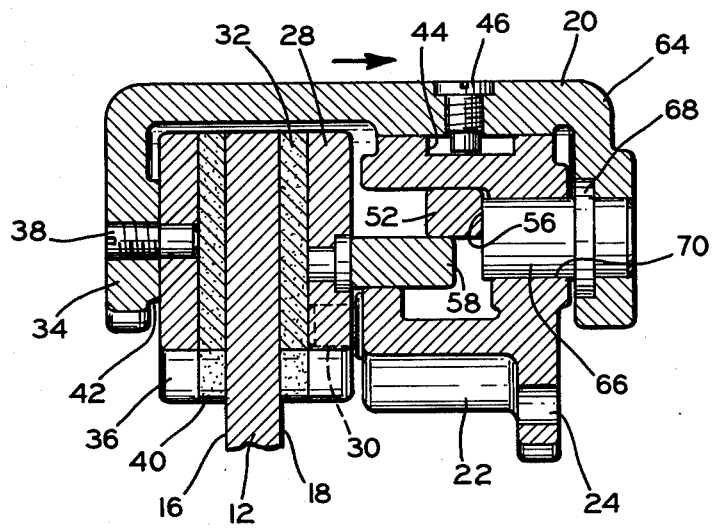
FIG. 7 is a sectional view of the apparatus illustrated in FIG. 3 taken along line 7—7 thereof.

With reference to the drawings, there is illustrated a mechanical caliper type disc brake assembly, generally indicated by reference numeral 10. The disc brake assembly 10 is particularly adapted for use as a wheel brake in motor vehicles, such as trucks and trailers, which include a rotor 12 fixed for rotation to a vehicle wheel 14, shown in phantom line in FIGS. 3 and 4. The rotor 12 has oppositely facing braking surfaces 16 and 18 which extend in a plane perpendicular to the axis of rotation of the rotor 12.

The brake assembly 10 is of a sliding caliper type and is supported for sliding movement in a direction perpendicular to the braking surfaces 16 and 18 of the rotor 12, and is held against rotation about the axis of rotation of the rotor 12 by a brake shoe 22. The brake shoe 22 has an array of holes 24 which are employed to receive threaded fasteners to attach the brake shoe 22 to a fixed axle flange 26.

A backing plate 28 containing a brake pad 32 is secured in sliding relation to the brake shoe 22 by spaced apart guide pins 30 which are threadably engaged in the brake shoe 22 and have an unthreaded portion adapted to be received in the backing plate 28, and thereby enables the backing plate 28 and the associated brake pad 32 to have limited axial sliding movement toward and away from the braking surface 18 of the rotor 12.

A backing plate 36 containing a brake pad 40 is suitably secured to a depending flange portion 34 of the caliper housing 20 by means of threaded fasteners 38. Extending inwardly of the inner wall of the depending flange portion 34 of the caliper housing 20, are spaced apart annular pressure applying bosses 42 which are designed to apply pressure against the outer surface of the backing plate 36 upon axial sliding movement of the caliper housing 20 as will become more apparent hereinafter.

The brake shoe 22 is provided with a pair of spaced apart upwardly opening slots 44 which are adapted to receive the unthreaded end portions of threaded fasteners 46 are threadably secured in threaded openings in the upper portion of the caliper housing 20. It will be appreciated that the unthreaded innermost ends of the threaded fasteners 46 are received within the slots 44 and in effect limit the sliding of movement of the caliper housing 20 with respect to the fixed brake shoe member 22.

A pivot pin 50 is suitably secured in a vertical position within appropriate spaced apart bushing members 48. A lever member 52 is typically pivotally received by the pivot pin 50 so as to pivot about the axis of the pin 50. The lever 52 is provided with an action lobe portion 54 and a reaction lobe portion 56. It will be observed that the lobe portion 54 is spaced an equidistance from the axis of the pin 50 as the lobe portion 56. Another lever 58 is similarly connected to the pivot pin 50 and has a reaction lobe portion 60 and a reaction lobe portion 62 at the end thereof. It will be observed that the lobe portion 60 is spaced an equidistance from the pivot pin 50 as the lobe portion 62.

The caliper housing 20 is further provided with a depending side flange portion 64 having a pair of spaced holes formed therein which are aligned with holes 70 in the brake shoe 22 to receive guide pins 66. The guide pins 66 are also provided with enlarged annular flange portions 68 adapted to be received in suitable cavities formed concentrically of the holes formed in the depending side wall 64 of the caliper housing 20.

Spaced apart wear pins 72 and 73 are positioned in the backing plate 28 and provide wearing surfaces for the action lobe portions 54 and 60, respectively, of the respective levers 52 and 58.

Figure 1:
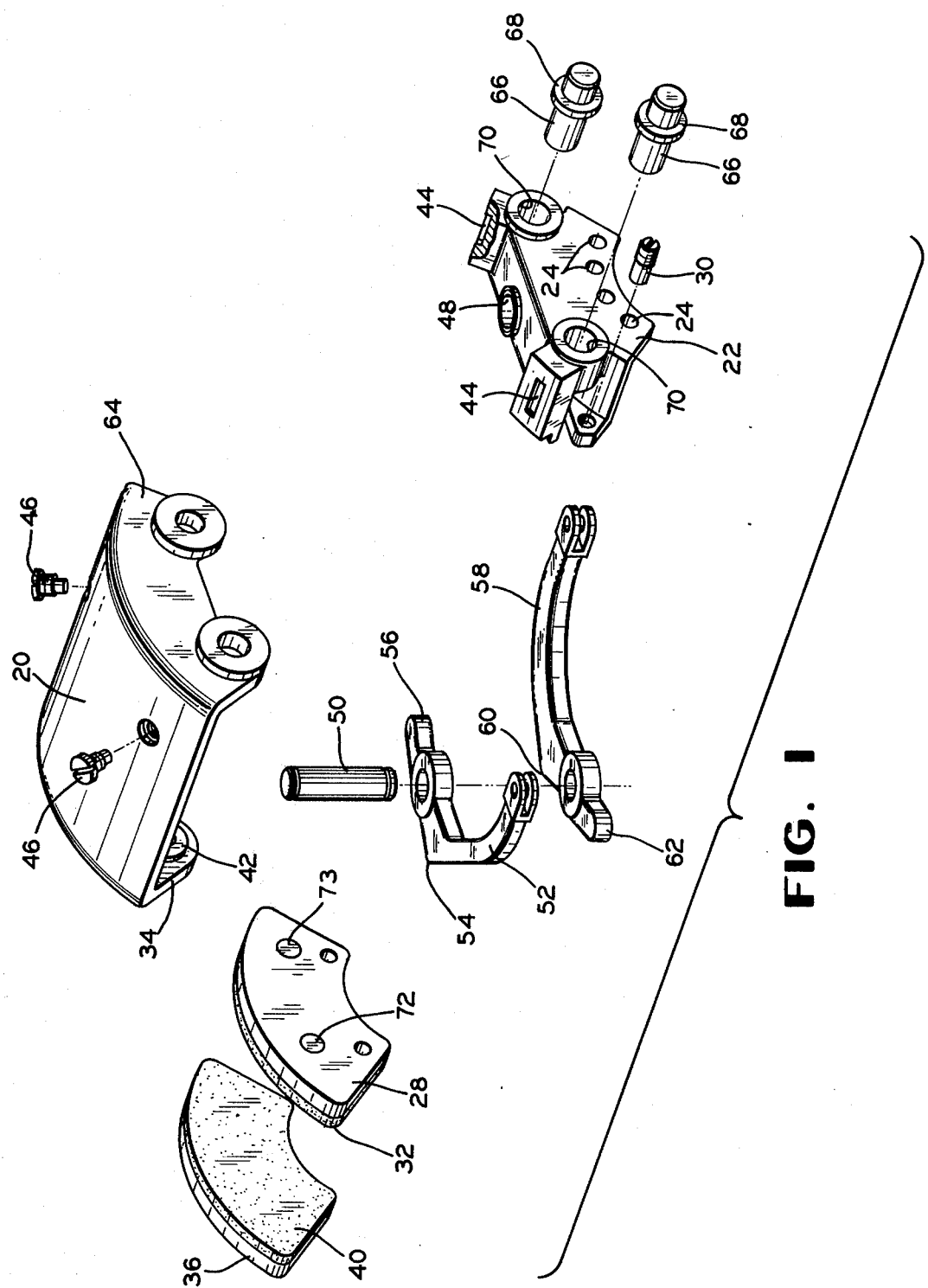
FIG. 1 is an exploded perspective view of a braking system incorporating the salient features of the present invention.
Figure 2:
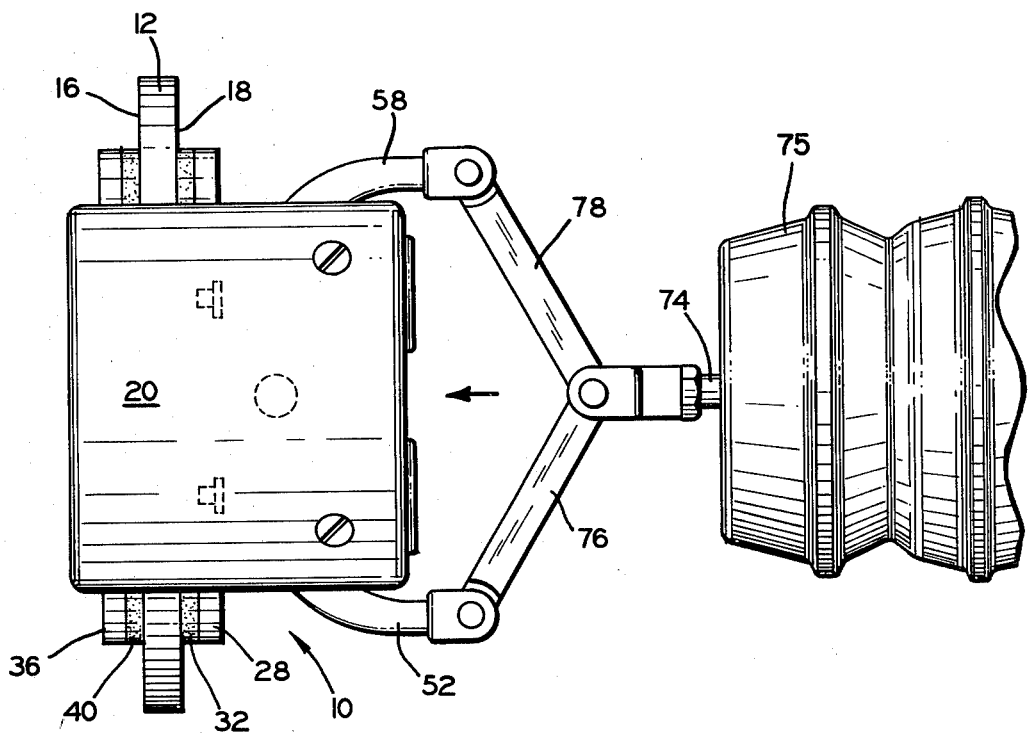
FIG. 2 is a fragmentary top plan view of the braking system illustrated in FIG. 1 in an assembled form.

As will be observed in FIG. 2, the brake assembly 10 is actuated by a pneumatic actuator 75 having a pushrod 74 having the outermost end thereof pivotally connected to the one end of linkages 76 and 78 which in turn have their opposite ends pivotally connected to the levers 52 and 58, respectively.

In operation, the pneumatic actuator 72 converts air pressure from the attendant vehicle to a mechanical force through the push rod 74 and its associated linkages 76 and 78 to the levers 52 and 58, respectively. As the push rod is caused to travel in the direction of the arrow in FIG. 2, for example, the levers 52 and 58 are caused to pivot about the pivot pin 50 such that simultaneous forces are applied by the action lobes 54 and 60 against the wear pin surfaces 72 and 73 to cause the friction lining 32 to be urged into intimate braking contact with the braking surface 18 of the rotor 12. Simultaneously, the reaction lobes 56 and 62 of the levers 52 and 58, respectively, simultaneously apply an opposite, an equal and opposite force against the guide pins 66 which cooperate to slide the caliper housing 20 in an opposite direction causing the friction lining material of the pad 40 to be urged against the braking surface 16 of the rotor 12. It will be appreciated that such operation provides equal loading to the contact points between the lobes 54 and 60 and their associated wear pins 72 and 73, and the lobes 56 and 62 and the guide pins 66 and their associated brake lining material of the pad 40.

It will be understood that initially, proper adjustment between the rotor 12 and the axle flange 26 is required to insure equal braking effect on both braking surfaces 16 and 18 of the rotor 12 through the friction pads 40 and 32, respectively.

It has been found that satisfactory results may be obtained by adjusting the brake assembly such that there is some light frictional contact constantly maintained between the brake pads 32 and 40 and the respective braking surfaces 18 and 16 of the rotor 12. It will be appreciated that by adjusting the threaded guide members 30 and 38 such adjustment can be readily achieved. By maintaining light contact between the brake pads 32 and 40 and the respective braking surfaces of the rotor 12, moisture fade characteristics of the brake system can be materially reduced.

It will be understood from the above description that the present invention has produced a mechanical caliper type disc brake which can be manufactured relatively inexpensively since it is comprised of a small number of relatively simple parts. Due to the fact that the major components, the caliper 20 and the broken shoe 22, may be formed out of die cast high tensile strength alloyws, for example, the resultant structure features the advantage of a combination of light weight and high strength. Also, the design will inherently and automatically compensate for wear and uneven wear of the two brake pads 32 and 40.

Each backing plate with the friction lining can be easily removed and replaced with a screwdriver in a matter of minutes.

In accordance with the provisions of the patent statutes, we have defined the principle and mode of operation of our invention, and have illustrated and described in a typical embodiment what is considered its best embodiment. It is understood that within the scope of the appended claims, the invention may be practiced otherwise than as specifically illustrated and described.

What we claim is:

1. In a mechanical caliper type disc brake system having a rotatable rotor wherein the improvement comprises:
    a pair of friction pads disposed on opposite sides of the rotor, each of said pads provided with backing plates;
    caliper means providing support for at least one of said friction pads;
    a stationary brake shoe slidably supporting the other of said friction pads;
    a slidable connection between said caliper means and said stationary brake shoe;
    lever means having spaced apart action and reaction lobe portions; and
    pivot means for pivotally supporting said lever means at a location between the action and the reaction lobe portions whereby when said lever means is moved about said pivot means the action lobe portion thereof urges one of said friction pads to move in one direction to frictionally engage one side of the rotor and simultaneously the reaction lobe portion thereof urges said caliper and the other of said friction pads to move in an opposite direction causing the friction pad to frictionally engage the other side of the rotor.

2. The invention defined in claim 1 wherein said lever means includes a pair of levers.

3. The invention defined in claim 1 wherein said slidable connection includes slot means formed in said stationary brake shoe for slidably receiving guide pin means depending from said caliper means.

4. The invention defined in claim 1 including wearing surfaces for the reaction lobe portions of said lever means.

5. The invention defined in claim 4 wherein said wearing surfaces includes guide pins located in said stationary brake shoe.

* * * * *